July 7, 1925.  
E. A. HERZOG  
DIRIGIBLE AUTOMOBILE HEADLIGHT  
Filed July 31, 1923  
1,544,984  
2 Sheets-Sheet 1

Inventor  
E. A. Herzog.

By Jack A. Ohley  
Attorney

July 7, 1925.                       1,544,984
E. A. HERZOG
DIRIGIBLE AUTOMOBILE HEADLIGHT
Filed July 31, 1923        2 Sheets-Sheet 2
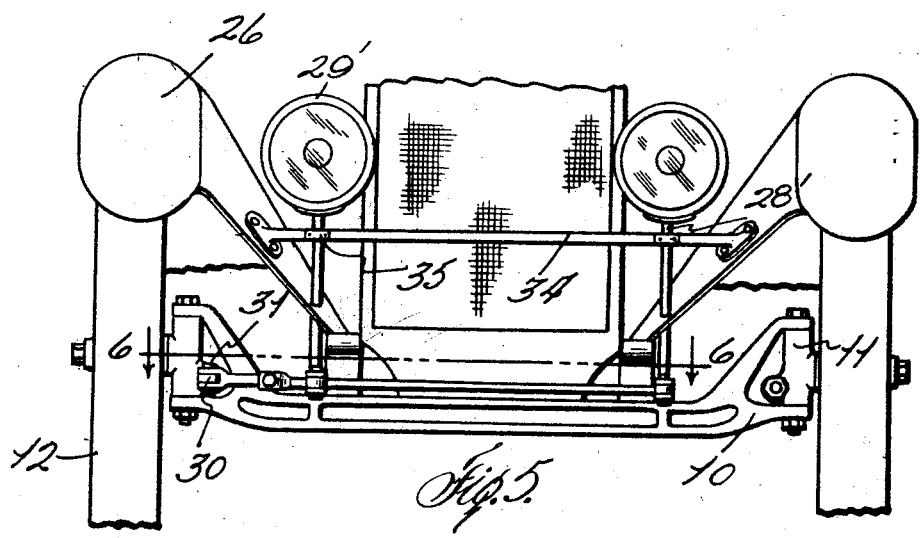
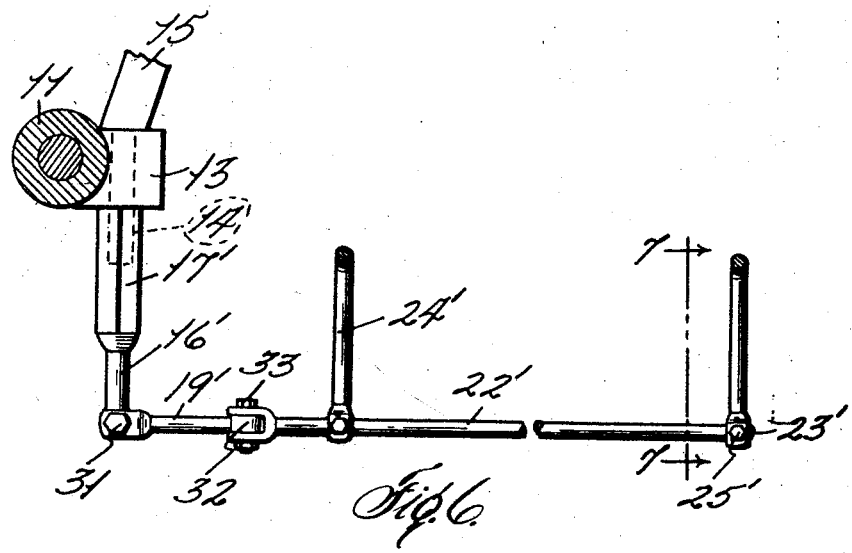
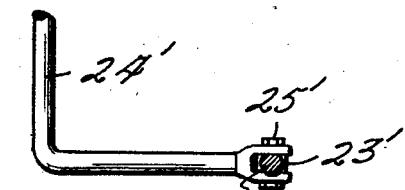
Inventor
E. A. HERZOG
By Jack A. Ashley
Attorney Patented July 7, 1925.

1,544,984

UNITED STATES PATENT OFFICE.

EDWIN A. HERZOG, OF DALLAS, TEXAS.

DIRIGIBLE AUTOMOBILE HEADLIGHT.

Application filed July 31, 1923. Serial No. 654,797.

*To all whom it may concern:*

Be it known that I, EDWIN A. HERZOG, citizen of the United States of America, residing at Dallas, in the county of Dallas and State of Texas, have invented certain new and useful Improvements in Dirigible Automobile Headlights, of which the following is a specification.

This invention relates to new and useful improvements in dirigible automobile headlights.

The object of the invention is to provide means of an improved type for automatically moving the headlights in unison with the front wheels of the car to illuminate the path of travel of the car in making turns.

A further object is to provide a device of the character set forth capable of being quickly and easily attached to an automobile with a minimum expenditure of time, labor and money; and which will embody an improved mechanical structure.

A construction designed to carry out the invention will be hereinafter described together with other features of the invention.

Figure 1:
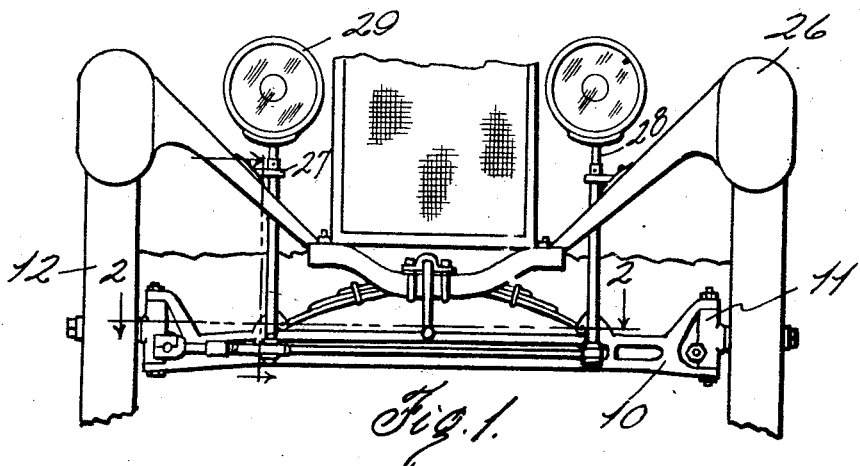
Figure 4:
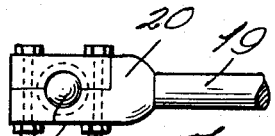
Figure 2:
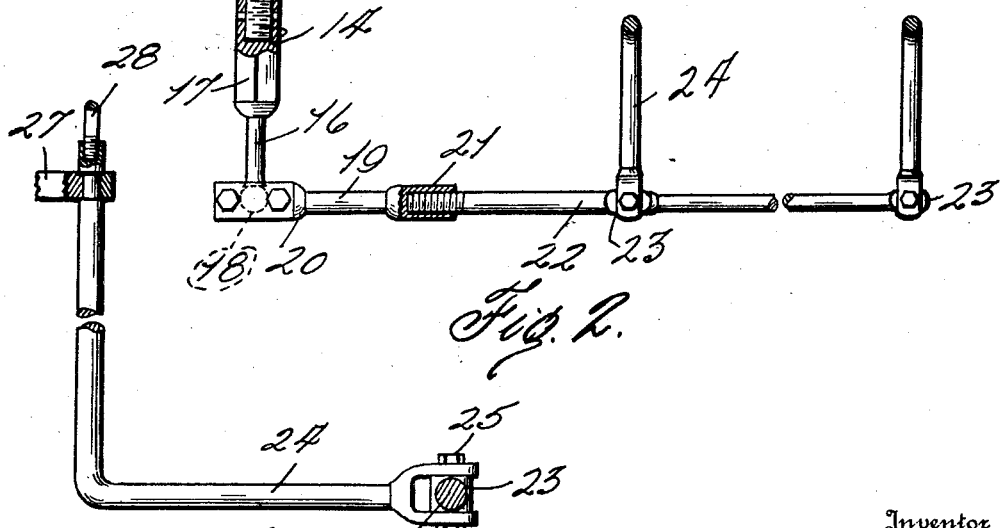
Figure 3:
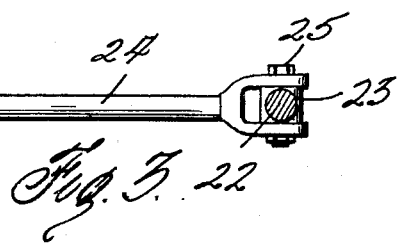

The invention will be more readily understood from a reading of the following specification and by reference to the accompanying drawings, in which an example of the invention is shown, and wherein:

Fig. 1 is a partial front elevation of an automobile showing a headlight turning means constructed in accordance with my invention, Fig. 2 is a cross-sectional view taken on the line 2—2 of Fig. 1, Fig. 3 is a detail of one of the crank arms for swinging the lamp, Fig. 4 is a detail of the ball and socket connection, Fig. 5 is a view similar to Fig. 1 showing a modified form, Fig. 6 is a cross-sectional view taken on the line 6—6 of Fig. 5, and Fig. 7 is a sectional view taken on the line 7—7 of Fig. 6.

In the drawings the numeral 10 designates the front axle of an automobile having at each end a spindle stud 11 on which the usual wheel 12 is mounted and on which has the usual laterally extending ear 13 for receiving the reduced screw threaded stem 14 of the steering knuckle 15. This stem in the present practice, extends forwardly through the ear and receives a nut (not shown) which holds the knuckle in the ear.

In carrying out my invention an elongated coupling 16 having a nut 17 at its inner end and a ball head 18 at its outer end is provided. The nut is screwed onto the stem up against the ear as is shown best in Fig. 2. A connecting link 19 has a split socket 20 receiving the head 18 and is disposed at right angles to the coupling. The nut 17 serves to hold the knuckle 15 and the coupling is swung in unison with the front wheel when the steering wheel is turned.

The link has a socket 21 at its inner end which is screw threaded to receive the end of a pitman 22, disposed in front of the axle. The pitman has a pair of spaced eyes 23, one at its end and the other intermediate its ends. These eyes are positioned to receive the bifurcated ends of crank arms 24, to which they are pivotally connected by bolts 25, (Figs. 2 and 3). The crank arms extend up through apertures in the fenders 26 and are supported in split bearing brackets 27 secured to the fenders, the arms being reduced at the brackets (Fig. 3). The upper ends of the arms are internally screw threaded for receiving the screw threaded ends of lamp posts 28 having each, a lamp 29 at its upper end. It will be seen that by swinging a crank arm the lamp attached thereto is also swung.

The lamps are controlled by the steering gear. When ever the stud 11 is moved in the steering of the car, the coupling 16 is likewise moved, which imparts a similar movement to the crank arms 24 through the means of the link 19 and pitman 22. The ball and socket joint permits a free movement. The lamps 29 will be turned in unison with the front wheels 12 and direct the light accordingly.

In Figs. 5 to 7 inclusive, I have shown a modified form. The first form described is intended for lamps on each side of the radiator, which the second form shown in Figs. 5 to 7 is intended for cars with lamps in front of the radiator. The coupling member 16' has a nut 17' but is provided with an eye 30 instead of a ball head. A connecting link 19' has its outer end bifurcated and receiving the eye 30, to which it is pivoted by a bolt 31. On its opposite end the link has an eye 32 pivoted on a bolt 33 in the bifurcated end of a pitman 22' which has eyes 23'.

Crank arms 24' are pivoted to the eyes 23' by bolts 25'. The upper ends of the arms are internally screw threaded to receive the posts 28' of lamps 29'. A cross bar 34 attached to the fenders extends in front of the radiator. This bar carries bearing brackets 35 which receive the reduced portions of the lamp posts. When the front wheels are turned the lamps are swung as has been previously described.

Various changes in the location and structure of the different parts as well as alterations and modifications may be made within the scope of the appended claim.

What I claim, is:

The combination with a spindle stud of a vehicle, of a coupling member secured thereto, a link pivoted to the outer end of said member, a pitman pivotally connected to said link at an angle to the coupling pivot thereof, a brace member upon the vehicle having bearing brackets, crank arms journalled in said brackets and pivoted to said pitman, and lamps mounted upon the upper ends of said arms.

In testimony whereof I affix my signature.

EDWIN A. HERZOG.